United States Patent [19]

Van Ochten et al.

[11] Patent Number: 5,499,390
[45] Date of Patent: Mar. 12, 1996

[54] CONTROLLED DEVICE FOR REMOVING THE ANUS OF SLAUGHTERED ANIMALS

[75] Inventors: Sander A. Van Ochten, Lichtenvoorde; Leonardus J. A. Tiggeloven, Groenlo, both of Netherlands

[73] Assignee: Stork R.M.S. B.V., Netherlands

[21] Appl. No.: 231,192

[22] Filed: Apr. 21, 1994

[30]  Foreign Application Priority Data

Apr. 22, 1993 [NL] Netherlands ............................ 9300686

[51] Int. Cl.⁶ ...................................................... A22B 5/00
[52] U.S. Cl. ........................... 452/122; 452/109; 452/120
[58] Field of Search ................................... 452/122, 120, 452/109, 149

[56]  References Cited

U.S. PATENT DOCUMENTS

| | | | |
|---|---|---|---|
| 4,023,237 | 5/1977 | Meyn | 452/122 |
| 4,087,886 | 5/1978 | Aubert | 17/52 |
| 4,779,307 | 10/1988 | Van Der Hoorn et al. | 452/149 |
| 5,112,272 | 5/1992 | Andersen | 452/120 |
| 5,141,471 | 8/1992 | Bekkers | 452/122 |
| 5,199,922 | 4/1993 | Korenberg et al. | 452/122 |

FOREIGN PATENT DOCUMENTS

| | | | |
|---|---|---|---|
| 0258939 | 3/1988 | European Pat. Off. | A22B 5/00 |
| 8817199 | 6/1990 | France | A01G 17/14 |
| 7606104 | 12/1976 | Netherlands | A22B 5/00 |
| 8910060 | 11/1989 | WIPO | A22B 5/00 |
| 9213458 | 8/1992 | WIPO | A22B 5/00 |

*Primary Examiner*—Willis Little
*Attorney, Agent, or Firm*—Webb Ziesenheim Bruening Logsdon Orkin & Hanson

[57]  ABSTRACT

A device for removing the anus of slaughtered animals. The device includes a cutting device for cutting out the anus of a slaughtered animal, which cutting device comprises a substantially cylindrical blade drivable for rotation and translation and having a leading cutting edge. The device further includes positioning elements for initially positioning the blade such that the center line thereof extends substantially through the anus of the slaughtered animal and a blunt locating pin for causing the blade to follow a curved path such that the cutting edge follows substantially the form of the rectum of the slaughtered animal while avoiding contact with bone.

20 Claims, 4 Drawing Sheets

CONTROLLED DEVICE FOR REMOVING THE ANUS OF SLAUGHTERED ANIMALS

BACKGROUND OF THE INVENTION

The invention relates to devices for removing the anus of slaughtered animals. Such devices include:
a cutting device for cutting out the anus of a slaughtered animal, which cutting device comprises a substantially cylindrical blade drivable for rotation and translation and having a leading cutting edge.

Such devices are known in the art.

NL-A-7606104 relates to a device wherein the cutting device with the blade can swing in a vertical plane.

FR-A-2 640 465 likewise relates to a device wherein the carriage can perform a swinging movement relative to a fixed pivot line.

Both cited publications relate to a technique wherein the carriage can perform a horizontal displacement and can perform a swinging movement in the vertical plane relative to a subsequently selected new horizontal position. Once a desired position is reached the rotatably driven cylindrical blade is displaced forward along its center line to cut out the anus.

WO-A-89/10060 relates to a device wherein a pig is placed and held in a determined position, the cutting device is then moved vertically and can subsequently swivel in a vertical plane round a pivot axis. The cutting edge of the blade herein follows a path such that the rectum is in great danger of being damaged, while contact between the cutting edge and bone is further not excluded.

The invention has for its object to embody a device of the stated type such that during the cutting operation the rectum is not damaged in order to prevent contamination of usable parts of the slaughtered animal, as little meat as possible located round the rectum is cut away in order to make the meat production as high as possible, and contact between the blade and bone is avoided.

SUMMARY OF THE INVENTION

With a view to the above, the device includes positioning means for initially positioning the blade such that the center line thereof extends substantially through the anus of the slaughtered animal and following means for causing the blade to follow a curved path such that the cutting edge follows substantially the form of the rectum of the slaughtered animal while avoiding contact with bone.

In a specific embodiment the device can have the feature that the following means are adapted to follow the form of the tailbone, the pubic bone and/or the backbone of the slaughtered animal. The advantage of this embodiment is that following hard parts is in general technically simpler to realize than following of soft parts.

A particular embodiment has the special feature that the blade is carried by and drivable for axial movement relative to a frame swivellable round a horizontal center line extending transversely of the lengthwise direction of the slaughtered animal such that the angle which the center line of the blade makes during rotating and axial driving during a cutting operation can vary through swivelling of the frame.

A preferred embodiment has the feature that the following means cause the frame to swivel during the cutting operation from a first angular position, wherein the center line of the blade makes a first angle with the backbone of the slaughtered animal, to a second angular position range wherein the center line of the blade makes a second angle within a chosen range with the backbone of the slaughtered animal, which second angle is greater than the first angle.

EP-A-0 259 939 relates to a device wherein the slaughtered animal is mechanically positioned relative to the cutting device. The cutting device can swing in a vertical plane such that, however, the above stated second angle is smaller than the first angle, in contrast to the invention.

This embodiment can advantageously have the special feature that the frame is spring-loaded to a rest swivel position such that the blade is self-locating. Such an embodiment can be simple, and thereby inexpensive and reliable.

A preferred embodiment of this type has the feature that the frame is coupled for swivelling to a pneumatic cylinder which is energized in the starting position by medium under relatively high pressure, whereby the cylinder has a fixed length and, in the situation in which the blade performs a cutting operation, is energized by medium under relatively low pressure, whereby the cylinder acts as a spring.

An embodiment has the special feature that the following means comprise a blunt locating pin placed coaxially with the cylindrical blade. This locating pin serves to control the blade, whereby the latter can follow the rectum. The embodiment is particularly important in the embodiment in which the frame is spring-loaded to a rest swivel position.

BRIEF DESCRIPTION OF THE DRAWINGS

The invention will be described hereinafter with reference to the annexed drawings, wherein.

DESCRIPTION OF THE PREFERRED EMBODIMENT

Figure 1:
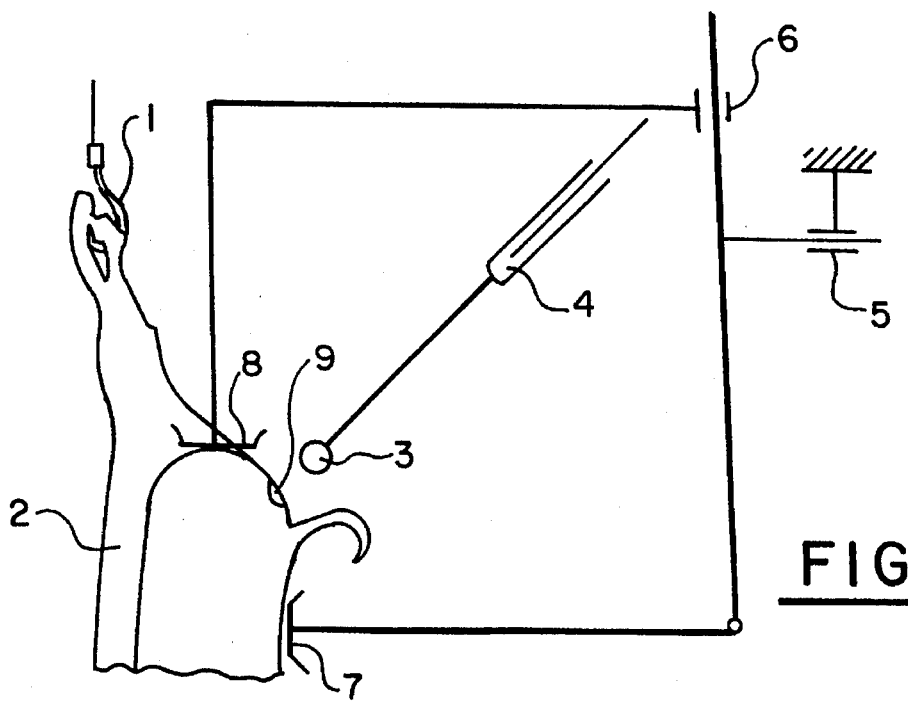
FIG. 1 shows a highly schematized side view of a device for removing the anus of slaughtered animals.

FIG. 1 shows that a pig 2 is suspended from its hind legs by means of suspension hooks 1. A cutting device 3 is movable at a fixed direction of entry by means of a linear drive 4. The drive 4 with the cutting device 3 form part of a carriage which is movable in the horizontal plane by a horizontal guiding 5 and associated drive means (not drawn). The carriage further bears a vertical guiding 6 with associated drive (not drawn) for vertical displacement of the cutting device 3 so that it is carried into a position relative to the sensor 7 of the slaughtered pig 2 such that the center line of the cutting device 3 extends to the anus 9 of the slaughtered animal 2.

Schematically designated positioning sensors 7 and 8 determine the desired position.

Figure 2:
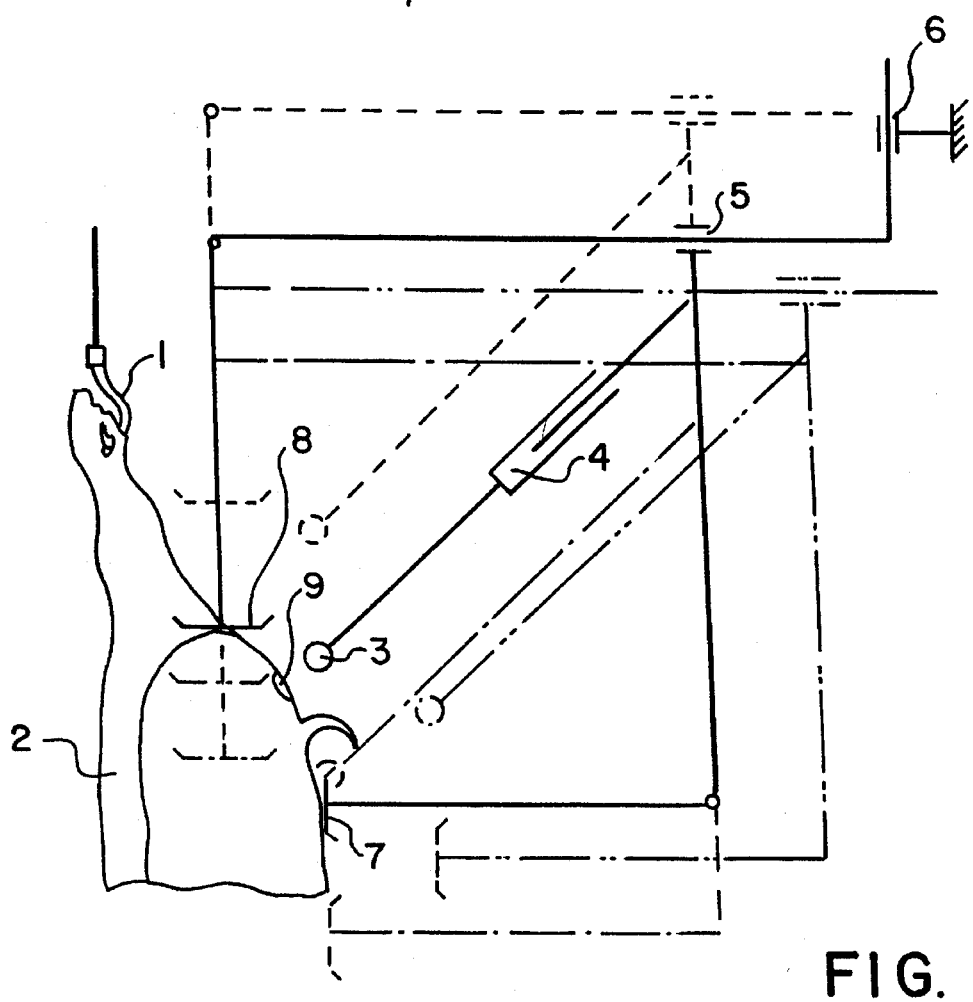
FIG. 2 shows a second embodiment in highly schematic side view.

In the embodiment according to FIG. 2 the unit 3, 4, 5, 7, 8 is vertically displaceable in its entirety via the vertical guiding 6, while the movement of the cutting device with the linear drive 4 takes place by means of the horizontal guiding 5.

FIG. 2 shows that it is always possible, irrespective of the dimensions of the pig 2 (long-short; thin-fat), to place the cutting device 3 in the correct position relative to the anus 9.

Figure 3:
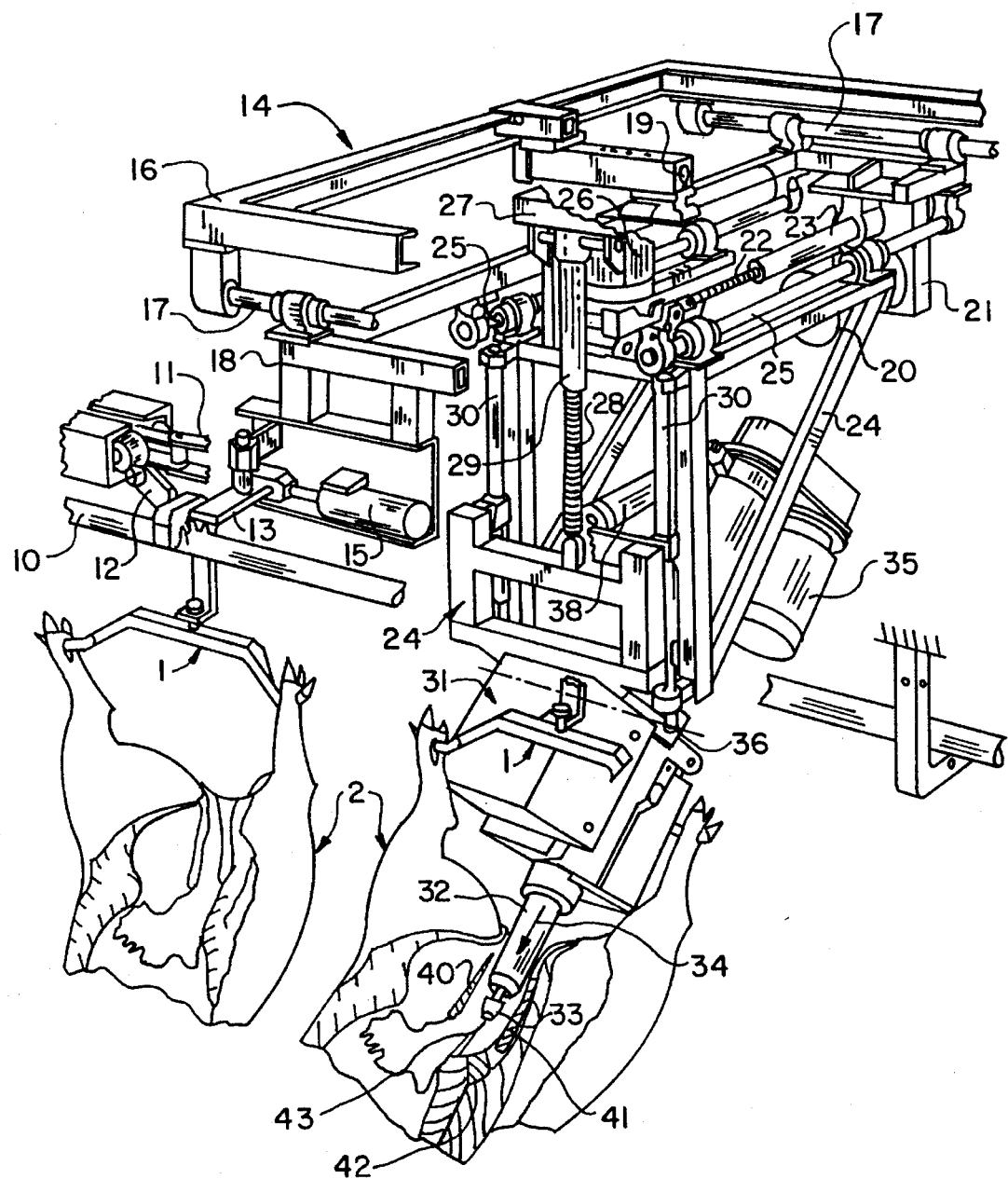
FIG. 3 shows a partly broken away perspective view of a device according to the invention.

FIG. 3 shows the hook 1 which is slidable over a rail 10 and driven by a drive chain 11 by means of carriers 12. The device 14 according to the invention can be carried along by the hook 1 by means of a carrier 13 such that during the cutting operation by the cutting device 14 the animal 2 stands still in relation to the device.

A fixed frame 16 supports via guides 17 an auxiliary frame 18 which is movable in lengthwise direction of the rail 10 by means of a linear drive 19. This drive serves for the horizontal movement of auxiliary frame 18 along rail 10.

A motor 20 drives via a transmission 21 a screw spindle 22 which, by means of an associated pipe with internal threading 23, horizontally drives a carriage 24 in a direction from and to the rail 10. The guiding takes place via horizontal guides 25 which correspond with the guide 5 as according to FIG. 1.

The vertical mobility is obtained by means of a motor 26, an associated transmission 27 and a screw spindle 28 with pipe 29 with internal screw thread. Guides 30 ensure the vertical guiding and correspond with the vertical guide 6 according to FIG. 1.

The carriage 24 bears the cutting device 14 with the frame 31, from which protrudes a cylindrical blade 32 with blunt locating pin 33. Coupled to the frame 31 is a drive motor 35 for the blade 32 in addition to a linear drive (not drawn) to set the blade into motion in axial direction 34.

Not drawn are measuring means for measuring the position of the cutting device relative to the anus 9, or the control means which process the output signals of these measuring means into control signals for the respective motors and drives.

FIG. 3 further shows that the frame 31, and therewith the blade 32, is connected to the carriage 24 via a pivot center line 36. Frame 31 can thus swing round the pivot center line 36. To control the swinging movement of frame 31, and therewith blade 32, a pneumatic cylinder 38 is placed between carriage 24 and frame 31, which cylinder is connected to a controllable source (not drawn) of gas under pressure.

Figure 4:
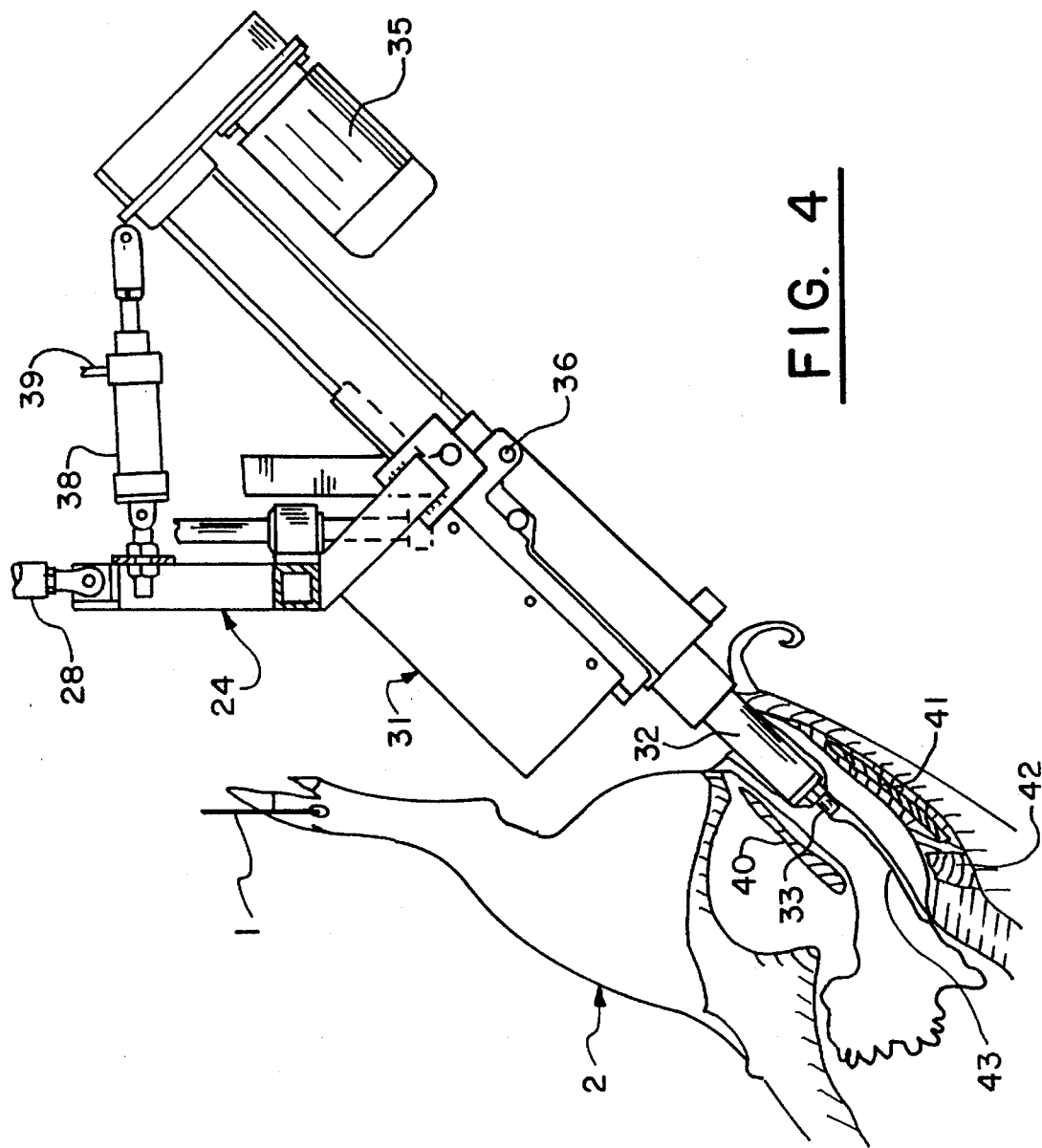
FIG. 4 shows a partly broken away side view of the device according to FIG. 3 in an operating position.

In the starting position shown in FIG. 4, which corresponds with the position shown in FIG. 3, medium under a pressure of about 6 bar is supplied to cylinder 38 via a pressure conduit 39. This cylinder thereby lies in its shortest position wherein the blade assumes the angular position shown in FIG. 4. It is noted that in the foregoing is already described the manner in which blade 32 can be placed correctly in the position to begin the cutting operation.

Figure 5:
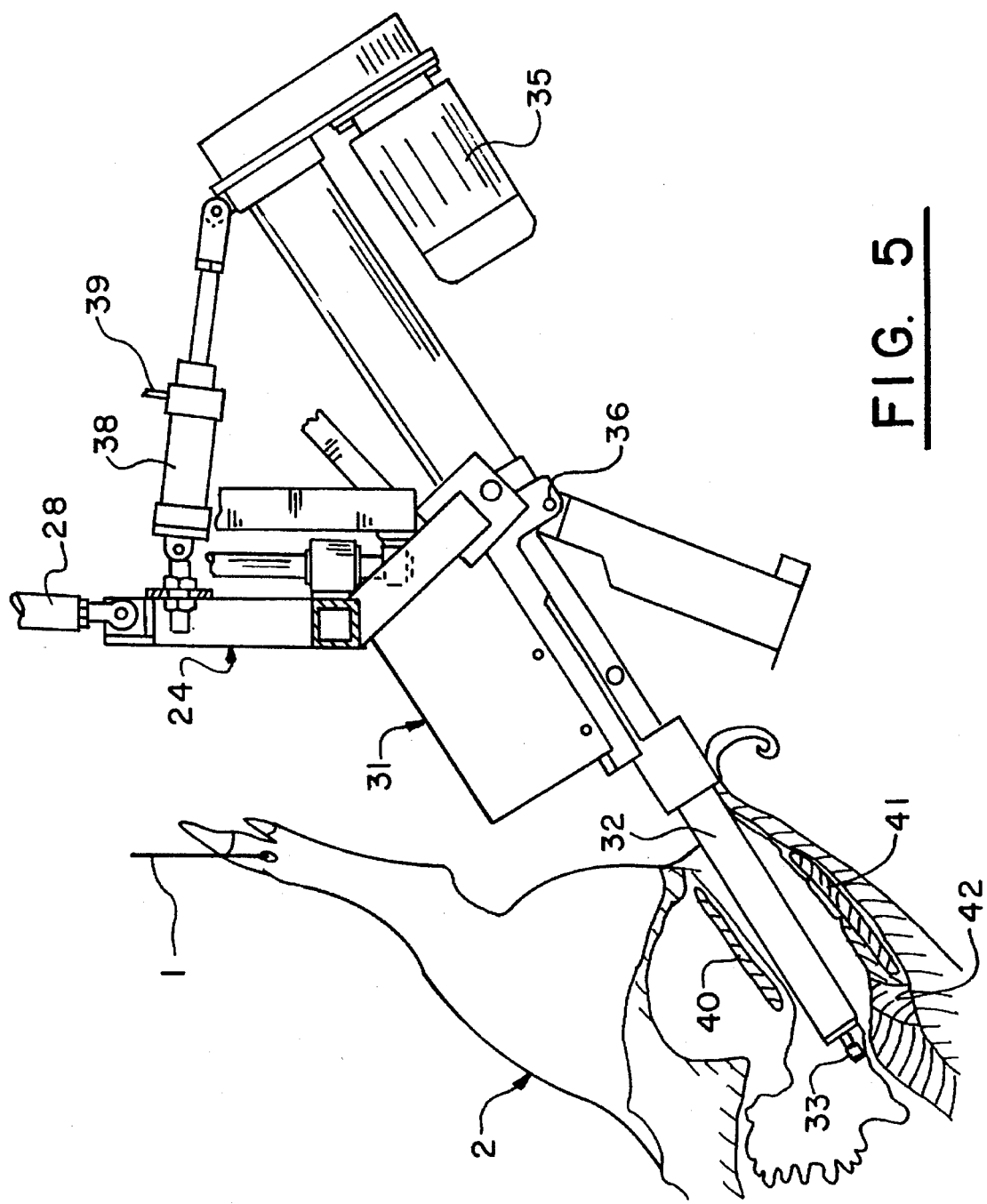
FIG. 5 shows a view corresponding with FIG. 4 of the device in a later stage of the cutting operation.

When the cutting operation has begun, not only blade 32 is set into rotation by the motor 35 but a linear displacement of blade 32 also takes place, wherein this latter is moved in axial direction 34 relative to the frame. Via pressure conduit 39 gas at a decreased pressure, for instance in the order of 1 bar, is now supplied to the pneumatic cylinder whereby the cylinder begins to act as a gas pressure spring and can pivot the blade 32 round pivot axis 36. Shown schematically in FIGS. 3, 4 and 5 are the pubic bone 40, the tailbone 41 and the backbone 42. Due to the resilient hingeability of blade 32 the rectum 43 can be effectively followed by the locating pin 33 under the guidance of these hard parts 40, 41, 42, so that the rectum can be cut out very accurately.

We claim:

1. A device for removing the anus of a slaughtered animal, said device comprising:

a cutting device for cutting out the anus of the slaughtered animal, said cutting device including a substantially cylindrical blade drivable for rotation and translation and having a leading cutting edge, wherein the blade is carried on a pivotable fame;

positioning means for initially positioning the blade such that the center line thereof extends substantially through the anus of the slaughtered animal; and following means for causing the blade on the pivotable frame to follow a curved path as the blade advances through the rectum such that the cutting edge follows substantially the lengthwise form of the rectum of the slaughtered animal while avoiding contact with bone.

2. The device as claimed in claim 1, wherein the following means are adapted to follow the form of the tailbone of the slaughtered animal.

3. The device as claimed in claim 1, wherein the blade is carried by, and is drivable for axial movement relative to, a frame pivotable round a horizontal center line extending transversely of the lengthwise direction of the slaughtered animal such that an angle which the center line of the blade makes during rotating and axial driving during a cutting operation can vary through swivelling of the frame.

4. The device as claimed in claim 3, wherein the following means cause the frame to swivel during the cutting operation from a first angular position, wherein the center line of the blade makes a first angle with the backbone of the slaughtered animal, to a second angular position range wherein the center line of the blade makes a second angle within a chosen range with the backbone of the slaughtered animal, which second angle is greater than the first angle.

5. The device as claimed in claim 3, wherein the frame is spring-loaded to a rest swivel position such that the blade is self-locating.

6. The device as claimed in claim 5, wherein the frame is coupled for swivelling to a pneumatic cylinder which is energized in the starting position by medium under relatively high pressure, whereby the cylinder has a fixed length and, in the situation in which the blade performs a cutting operation, is energized by medium under relatively low pressure, whereby the cylinder acts as a spring.

7. The device as claimed in claim 1, wherein the following means comprises a blunt locating pin placed coaxially with the cylindrical blade.

8. The device as claimed in claim 1, wherein the following means are adapted to follow the form of the pubic bone of the slaughtered animal.

9. The device as claimed in claim 1, wherein the following means are adapted to follow the form of the backbone of the slaughtered animal.

10. The device as claimed in claim 6, wherein the following means comprise a blunt locating pin placed coaxially with the cylindrical blade.

11. The device as claimed in claim 5, wherein the following means comprise a blunt locating pin placed coaxially with the cylindrical blade.

12. The device as claimed in claim 4, wherein the following means comprise a blunt locating pin placed coaxially with the cylindrical blade.

13. The device as claimed in claim 3, wherein the following means comprise a blunt locating pin placed coaxially with the cylindrical blade.

14. The device as claimed in claim 2, wherein the following means comprise a blunt locating pin placed coaxially with the cylindrical blade.

15. A device for removing the anus of a slaughtered animal, said device comprising:

a cutting device for cutting out the anus of the slaughtered animal, said cutting device including a substantially cylindrical blade drivable for rotation and translation and having a leading cutting edge;

positioning means for initially positioning the blade such that the center line thereof extends substantially through the anus of the slaughtered animal; and following means for causing the blade to follow a curved path such that the cutting edge follows substantially the form of the rectum of the slaughtered animal while avoiding contact with bone, wherein the blade is carried by, and is drivable for axial movement relative to, a frame pivotable round a horizontal center line extending transversely of the lengthwise direction of the slaughtered animal such that an angle which the center line of the blade makes during rotation and axial driving during a cutting operation can vary through swivelling of the frame, and wherein the following means cause the frame to swivel during the cutting operation from a first angular position, wherein the center line of the blade makes a first angle with the backbone of the slaughtered animal, to a second angular position range wherein the center line of the blade makes a second angle within a chosen range with the backbone of the slaughtered animal, which second angle is greater than the first angle.

16. The device as claimed in claim 15, wherein the following means comprise a blunt locating pin placed coaxially with the cylindrical blade.

17. A device for removing the anus of a slaughtered animal, said device comprising:

a cutting device for cutting out the anus of the slaughtered animal, said cutting device including a substantially cylindrical blade drivable for rotation and translation and having a leading cutting edge;

positioning means for initially positioning the blade such that the center line thereof extends substantially through the anus of the slaughtered animal; and following means for causing the blade to follow a curved path such that the cutting edge follows substantially the form of the rectum of the slaughtered animal while avoiding contact with bone, wherein the blade is carried by, and is drivable for axial movement relative to, a frame pivotable round a horizontal center line extending transversely of the lengthwise direction of the slaughtered animal such that an angle which the center line of the blade makes during rotation and axial driving during a cutting operation can vary through swivelling of the frame, and wherein the frame is spring-loaded to a rest swivel position such that the blade is self-locating.

18. The device as claimed in claim 17, wherein the following means comprise a blunt locating pin placed coaxially with the cylinder blade.

19. The device as claimed in claim 17, wherein the frame is coupled for swivelling to a pneumatic cylinder which is energized in the starting position by medium under relatively high pressure, whereby the cylinder has a fixed length and, in the situation in which the blade performs a cutting operation, is energized by medium under relatively low pressure, whereby the cylinder acts as a spring.

20. The device as claimed in claim 19, wherein the following means comprise a blunt locating pin placed coaxially with the cylindrical blade.

\* \* \* \* \*